STREET BOUNDARY POST

Original Filed Dec. 9, 1966

United States Patent Office

Re. 26,779
Reissued Feb. 3, 1970

26,779
STREET BOUNDARY POST

Erich Weichenrieder, Post Zorneding,
Ingelsberg 14, Germany

Original No. 3,421,473, dated Jan. 14, 1969, Ser. No. 600,580, Dec. 9, 1966. Application for reissue Apr. 15, 1969, Ser. No. 822,080
Claims priority, application Germany, Dec. 10, 1965, W 40,490; Jan. 14, 1969, 3,421,473
Int. Cl. E01f *9/10;* G09f *17/00*
U.S. Cl. 116—63 7 Claims

Matter enclosed in heavy brackets [ ] appears in the original patent but forms no part of this reissue specification; matter printed in italics indicates the additions made by reissue.

This invention comprises a street boundary post with a hollow space opening at least upwards, and having a holding arrangement for a rod type snow sign.

Conventional street boundary posts perform their duty in the warm months of the year, but they fail in winter as they are obliterated by the snow and covered up by the masses of snow heaped up on each side of the road by snow ploughs or the like. The appropriate authorities are therefore compelled to provide the sides of the road with additional snow signs before the onset of winter. These snow signs are predominantly in the form of long rods, which are stored throughout the summer in storage places.

Now it has already been proposed to provide street boundary posts with holding systems for these snow signs, so that the snow signs do not have to be stuck in the ground, where paving or rocky soil often makes it difficult to find a suitable place to stand them. The suggestion however involves a very serious disadvantage.

For storage, painting, impregnating the wooden rods or for cutting the young tree trunks frequently used instead of them in side streets, and for removing the branches from these trunks, annually recurring costs are incurred. Further costs arise because the snow signs are distributed and set in place along the streets using lorries and a labour force, and then have to be removed again in the spring. As usually the distance apart in a straight line of the snow signs is about 80 feet and in curved streets or stretches about 50 feet, it will readily be understood that according to the calculations of German authorities concerned the setting in place of the snow signs means a yearly cost of about 35 dollars per mile, without taking into account the cost of storage and maintenance.

The object of the invention is to reduce this expense considerably and to produce a street boundary post which can be used both in summer and winter and in this connection to render superfluous to a very great extent the storage and preparation, and also the transport and removal of snow signs. It is also particularly intended to do away with the use of lorries and a large labour force.

This object is attained in accordance with the invention by the snow sign being arranged axially movable inside the street boundary post, an axial guide for the snow sign being provided at the upper end of the post, and the street boundary post and the snow sign having engagement means co-operating with one another and suitable for fixing the snow sign in its rest position inserted in the post, and also in its drawn-out operative position.

Thanks to this solution the snow sign is protected throughout the summer inside the post, is drawn out by a single handle in autumn and pushed back again in the spring. Where the depth of snow to be anticipated makes it necessary the snow sign consists of at least two vertically telescopable guided components. In order to ensure with a multipart snow sign also that in summer the snow sign cannot easily be drawn out by vandals, and that in winter the snow signs remains safely in the drawn out position, the components preferably have catch engagement means co-operating with one another which fix in relation to one another both in their drawn-out position and also when pushed one inside the other.

In order to be able to fit easily visible auxiliary signs quickly, such as warning lamps, traffic signs or the like, in the case of special traffic conditions, say an accident or road works, the snow sign is preferably provided with a transverse bore at its upper end.

It has been found particularly advantageous to make the post and snow sign of plastics. The use of plastics material makes possible a particularly advantageous construction, thanks to which the post, if for instance a snow-plough or a car hits it, can spring resiliently from its base without being seriously damaged. The idea of this construction is that the lower end of the post is formed as a longitudinally slotted hollow cylinder, terminating downwards in a conical widening, while substantially in the vicinity of the upper end of this widening an annular groove extends round and where further a post type base fits by its upper conical part in this conical widening and has at the upper end an annular beading associated with this annular groove.

A general object of this invention is to provide a generally improved and more satisfactory road boundary post.

These and other desirable objects may be attained in the manner disclosed as an illustrative embodiment of the invention in the following description and in the accompanying drawing forming a part hereof, in which.

Figures 1, 2, 3, 4, 5:
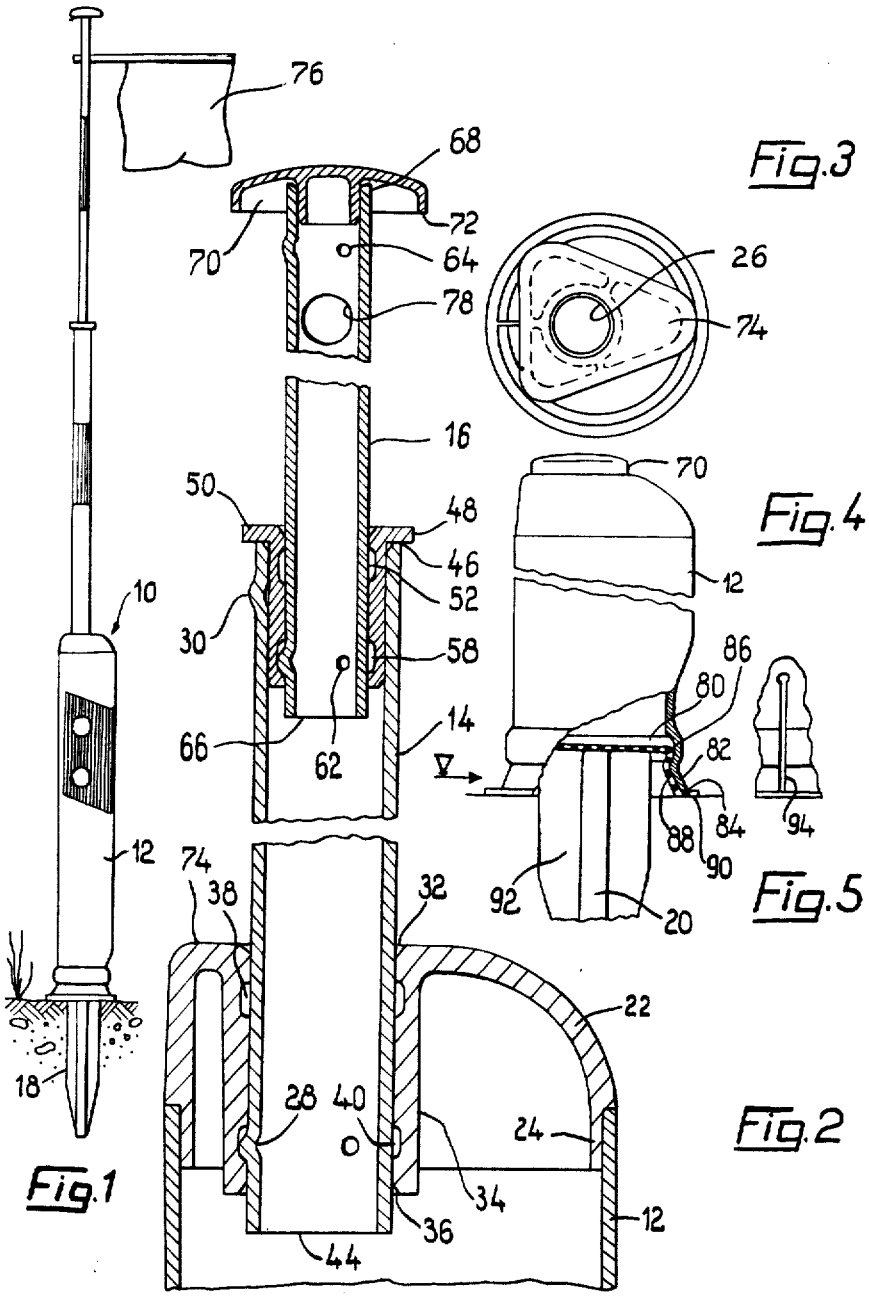
FIG. 1 is a general view of the street boundary post with the snow sign drawn out and a warning flag fitted.
FIG. 2 is a longitudinal section through the upper end of the post and the components of the snow sign.
FIG. 3 is a plan of the upper end of the post without the snow sign.
FIG. 4 is a view of the street boundary post with the snow sign drawn in, that is to say the upper end of the post and the lower end partly in section.
FIG. 5 a detail view in the direction of the arrow V in FIG. 4.

A street boundary post designated as a whole by 10 consists of an actual post 12, whose cross-section is usually an isosceles triangle, but changes into a cylindrical shape at its lower end, of two tubular components 14 and 16 telescopically insertable into the post and forming the snow sign, and of a base 18, which can be pressed by a post type extension 20 into the ground or released again as requisite. The base 18 is preferably made of light metal, while the other parts of the street boundary post are of plastics.

This choice of material has been found particularly advantageous, as the general object of the invention is to permit the equipment of street with street boundary post and snow signs particularly cheaply. As the parts exposed to weathering are plastics they are to the highest degree insensitive to the action of the weather and in addition to this they have the elasticity required for the functioning of the catch engagement connections which have yet to be described. As a further result of this elasticity the street boundary post in accordance with the invention is capable of resisting mechanical shock, the post releasing itself from its base in a manner which will be described later on if anything hits the post, so that usually no further damage takes place.

The post 12 is made hollow and is closed at its upper end by a cap 22 which is inserted by a tapered extension 24 in the post and is welded or bonded to it. The cap 22 has an upper aperture 26 which is provided with a conically widened rim 32 for easier insertion of the snow sign and also in connection with the nipples 28 and 30 associated with the catch engagement arrangement which will be described in more detail in what follows, and fitted to the snow sign. From the aperture 26 there extends into the interior of the cap 22 a sleeve type vertical guide 34, which is likewise provided at its lower aperture with a conically widened rim 36. Near the upper and lower ends of the guide 34 there is provided in each case an annular groove 38 or 40 respectively.

Movable vertically in the guide 34 is a first tubular component 44 of the snow sign, near whose lower end are arranged, uniformly distributed, three outwardly pressed nipples 28 which engage in the groove 40 when the component 14 is drawn out of the post 12. In order to make possible secure engagement the groove 40 is made somewhat wider than the nipple 28.

Near the upper end 46 of the first component 14 there are arranged in the same way three nipples 30, which engage in the upper groove 38 of the guide 34 when the component 14 is pushed in. From the upper end 46 there is pushed in, till it comes against a collar 48, a guide sleeve 50, which has similarly to the guide 34 two grooves 52 and 58, to which there are assigned, on a second component 16 of the snow sign, which is movable in the guide component 48, two groups of three nipples (in each case) 62 or 64 respectively, near the lower end 66 or near the upper end 68 of the second component 16. In the upper end 68 of the second component 16 there is inserted a cover cap 70 which is welded or bonded to this second component 16, the cap 68 being made wide enough to be applied by its lower rim 72 on the surface 74 of the cap 22 when the snow sign is completely inserted in the post 12, and thus to cover the aperture in the cap.

For the purpose of fitting auxiliary signs, warning lamps or, as shown in FIGURE 1, a warning flag 76, one of the components, preferably the upper component 16, is provided with a transverse bore 78.

At its lower end the post 12 is made cylindrical and has an annular groove 80, from whence it widens downwardly in a conical section 82 to its lower rim 84. The base 18 is made of sheet metal in its upper part and has an annular beading 86, which is assigned to the annular groove 80. Next downwards to this annular beading 86 there is a conical section 88, which is associated with the conical widening 82 of the post 12 and which terminates in an annular horizontal collar 90, on which, when the post 12 is placed in position, its lower rim 84 rests. From the upper end of the base there extends centrally a tube 20 as a post type extension; next to this there are radially outwardly extending ribs 92. These ribs hold the base laterally, so that when lateral forces act on the post 12 it cannot be pushed out of its position.

When such forces occur, for instance when a vehicle hits the post, it is tipped round the beading 86 of the base, in which connection the tapered widening 82 can widen out through a slot 94 (FIGURE 5), so that the post only jumps from the base. In a similar way the slot 94 also facilitates the application of the post 12 on the base 18. In order to make possible in this connection a canted application first of all of the post, the groove 80 is made wider than the beading 86. Nevertheless the post 12 is firmly mounted on the base 18, thanks on the one hand to the conical surfaces 82 and 88 and on the other hand by the collar 90, on which the lower rim of the post 12 is mounted, so that the post is chucked between the beading 86 and the collar 90.

In the case of the components 22 and 14 or 14 and 16 respectively, which are movable in relation to each other, there are provided in each case two separate catch grooves 38 and 40 or 52 and 58 for the drawn-out and the pushed-in positions so that the nipples, in either end position, need not be drawn completely way over the whole guide surface, which would only be possible with the expenditure of very considerable force. By contrast the construction illustrated and described makes it possible to release the telescopic components 16 and 14 from their drawn-out position by a light blow on the cap 70, easily push them together and by a further light tap on the cap 70 anchor them in the rest position, in which the nipple 64 engages in the groove 52 and the nipple 30 engages in the groove 38. If the snow sign is to be drawn out, a flat object is pushed between the cap 70 and the surface 74, which is easily possible because of the groove 38 being wider than the nipple 30, after which the locking arrangement 30, 38 can be overcome by a lever action, as can also the locking arrangement 52, 64, after which the snow sign is easily drawn out at length, and the catch engagement of the connections 28, 40 and 58, 62 is effected by a last powerful pressure.

It is to be understood that the disclosure is given by way of example only, rather than by way of limitation, and that without departing from the invention, the details may be varied within the scope of the appended claims.

What is claimed is:

1. A street boundary post comprising an upright tubular base member, said base member having an internal integral conceniric guide sleeve at the upper end thereof, said sleeve being inwardly spaced from the inner wall of said member, a first rod member telescopically received within side guide sleeve and extending into said base member, vertically spaced female catch means formed internally in the inner wall of said guide sleeve, and vertically spaced complementary male catch means formed exteriorly in the wall of said rod member, said male catch means respectively cooperating with said female catch means to selectively maintain said rod member in an extended position and a retracted position within said base member.

2. A street boundary post as defined in claim 1, wherein said first rod member is hollow and a second guide sleeve is positioned within the upper portion of said first hollow rod member, a second rod member slidably received within said second guide sleeve and said first hollow rod member, vertically spaced female catch means formed in the inner wall of said second guide sleeve and complementary spaced male catch means formed exteriorly on the wall of said second rod member, said female catch means respectively cooperating with said male catch means to selectively maintain said second rod member in an extended position relative to said first rod member and a retracted position in said first rod member.

3. A street boundary post as set forth in claim 2, wherein said female catch means constitute two spaced annular grooves and said male catch means constitute complementary protuberances.

4. A street boundary post as defined in claim 3, wherein an oversize cap member is fitted to the upper end of said second rod member, whereby when said post is in its full retracted condition said cap member protects the interior of said base member.

5. A street boundary post as defined in claim 1, wherein said post is made of plastic material.

6. A street boundary post as defined in claim 2, wherein a transverse bore is provided in the upper portion of said second rod member for insertion of an auxiliary sign support means.

7. A street boundary post as defined in claim 1, wherein the lower portion of said base member is provided with a vertical open ended slot in the wall thereof, said base member terminating in a conical widening portion, an annular groove formed in the interior of said conical portion, a ground penetrating pin, said pin having a complementary conical portion at its upper end, an annular bead formed on said complementary conical portion for snap insertion in said annular groove, and a horizontal annular flange extending outwardly from the end of said conical wide portion.

References Cited

The following references, cited by the Examiner, are of record the the patented file of this patent or the original patent.

UNITED STATES PATENTS

| | | | |
|---|---|---|---|
| 504,987 | 9/1893 | Marum | 116—173 |
| 859,233 | 7/1907 | Lane | 116—173 |
| 1,302,190 | 4/1919 | McCormack | 116—173 |
| 1,812,737 | 6/1931 | Coughlin et al. | 248—156 |

| | | | |
|---|---|---|---|
| 1,863,756 | 6/1932 | Lupkin | 116—173 X |
| 2,263,138 | 11/1941 | Olson | 52—298 |
| 2,298,140 | 10/1942 | Mace | 287—58 |
| 2,720,249 | 10/1955 | Peterson | 248—156 |
| 2,947,557 | 8/1960 | Schwab et al. | 287—58 |
| 3,119,588 | 1/1964 | Keats | 248—158 |
| 3,317,168 | 5/1967 | Ziph | 94—1.5 |

LOUIS J. CAPOZI, Primary Examiner

U.S. Cl. X.R.

40—145; 52—146; 116—173; 248—156